INVENTOR.
ARCHIE R. GAGNE

ATTORNEY

INVENTOR.
ARCHIE R. GAGNE

3,326,009
PLOW FOR LAYING CABLE, FLEXIBLE CONDUIT OR THE LIKE
Archie R. Gagne, 29W629 N. Aurora Road, Naperville, Ill. 60540
Filed Aug. 12, 1964, Ser. No. 389,151
12 Claims. (Cl. 61—72.6)

This invention relates generally to apparatus for laying a cable or flexible conduit in a slit trench, and has particular reference to a cable laying plow having vibratory movement for facilitating the deposition of a flexible cable or conduit in a slit trench formed by the vibrating action of the plow.

The improved cable laying plow according to the present invention is particularly adapted for use in the laying of buried telephone cable or the like. It is, however, capable of other uses, and plows constructed according to the principles of the present invention may, for example, by omission of the cable laying features and whatever other modification may be found desirable, be employed for producing slit trenches for soil and water conservation projects. Irrespective of the particular use to which the structure according to the present invention may be put, the essential features of the invention are at all times preserved.

Heretofore, in connection with the burying of service cables, the usual operations have included the digging of a trench and backfilling the same after the cable is laid therein, such operations being time consuming and relatively expensive, as well as being possessed of numerous functional limitations, the principal one being the unsightliness of the job site. Restoration of the ground surface above the buried cable presents a problem that cannot be immediately solved, as for example when it is necessary to plant grass seed in the backfill. The presence of roots and other submerged vegetation also adds to the difficulty of the trenching operation.

The structure according to the present invention is designed to overcome the above-noted limitations that are attendant upon the laying of buried cable by a wide trenching operation and, toward this end, the invention contemplates the provision of a novel cable-laying plow having a plowshare which progressively slits the earth along a longitudinal path where the cable is to be buried, and which at the same time progressively feeds a cable into the slit trench, the walls of the slit automatically closing upon the thus fed cable progressively as the plow travels forward. No appreciable amount of earth is elevated from the surface of the ground and, ordinarily, after the first succeeding rainstorm, the slot becomes fully closed with little evidence of its former existence. Insofar as the presence of roots or other submerged vegetation is concerned, the plow of the present invention is capable of cutting through all but the most stubborn obstacles.

There are in existence plows which are capable of progressively slitting the earth to produce slit-type trenches wherein very little earth is removed. Such plows are usually tractor pulled and the swaths cut thereby are relatively wide and are designed for a mulch fill in connection with water and soil conservation projects. The effort required to pull such plows is great, and the plows are not designed to cut through roots and similar obstructions, special and separate sawing devices being provided for this purpose. To lessen the power required to pull such plows, some of them are provided with means for effecting vertical reciprocation of the plowshares but even when this expedient is resorted to, the vehicles which constitute the plows are incapable of being efficiently self-propelled due to the inability to attain proper ground traction and, as a consequence, they generally must be tractor drawn.

The present invention is designed to overcome the above noted limitations attendant upon the construction and operation of plows of the type capable of producing slit trenches and, toward this end, the invention contemplates the provision of a novel self-propelled plow having associated therewith a relatively thin, blade-like oscillatable plowshare which, when in operation, has a fore and aft component of motion, as well as a vertical up and down component of motion. The amplitude of the fore and aft component of motion appreciably exceeds the amplitude of the vertical component of motion and, what is more important, the lineal rate of oscillation of the plowshare exceeds the maximum rate of forward movement of the plow vehicle so that there is a repeated rapid retraction of the leading cutting edge or "shin" of the plowshare. Stated in other words, the relatively large amplitude of horizontal movement and the relatively short amplitude of vertical movement imparted to the plowshare results in an oscillatory motion of the plowshare in a horizontally elongated elliptical path, such motion resulting in a repetitous forward impact operation upon the ground by the leading edge of the plowshare, thereby greatly reducing the power necessary to drive the plow vehicle.

Another and important advantage offered by the provision of such motion of the plowshare is that such a motion tends to operate through the vehicle frame to pull the traction wheels of the vehicle downwardly and thus increase the traction which is attained when driving the plow vehicle forwardly. This downdraft is attained by causing the oscillation of the plowshare to take place in a direction where the plowshare rises through the forward end of the horizontal major axis of the ellipse of movement and descends through the rear end of the major axis. While rising, the leading edge or shin of the plowshare is in forcible contact with the compact earth. While descending, the shin travels freely through the already formed slit trench. The plowshare frame is thus constrained to be pulled downwardly and increase the tractional reaction of the driving wheels on the ground. By such an arrangement it is not necessary to employ crawler wheels with lugs, as has been considered necessary heretofore even when the plow vehicle is tractor drawn. Instead it is possible to employ rubber tired wheels for driving purposes, thereby facilitating free travel of the plow vehicle when idle and on concrete or other highways during transportation thereof to and from a given scene of operation.

The provision of a plow of the character briefly outlined above, and possessing the stated advantages, being among the principal objects of the invention, it is a further object to provide such a plow wherein the plowshare is provided with a rigidly attached cable guiding tube or channel, the tube moving bodily with the plowshare during oscillation thereof so that the cable is agitated during feeding thereof into the slit trench, thus continuously freeing the cable for feeding purposes and precluding the possibility of binding of the cable within the tube.

Another object of the invention is to provide a novel eccentric and rocker mechanism for effecting the above-described elliptical oscillatory motion of the plowshare, the system being comprised of relatively few parts and therefore being unlikely to get out of order.

A further object of the invention is to provide a novel and effective hydraulic control system for the plow vehicle wherein a single fluid pump is employed, and serves under the control of suitable valve means to selectively actuate the eccentric and linkage mechanism for effecting oscillation of the plowshare, the traction wheels for both forward and reverse propelling of the vehicle as well as for steering of the latter, and the lift mechanism whereby the plowshare and cable guide tube may be lowered and raised into and out of operative cable-laying position.

The provision of a cable-laying plow which is of simple construction and which therefore may be manufactured at a low cost; one which is rugged and durable and which therefore will withstand rough usage; one which is comprised of a minimum number of parts, particularly moving parts, and which therefore is unlikely to get out of order; one in which the component parts thereof are readily accessible for purposes of inspection, replacement of parts or repair thereof; and one which, otherwise, is well adapted to perform the services required of it, are further desirable features which have been borne in mind in the production and development of the present invention.

Numerous other objects and advantages of the invention, not at this time enumerated, will readily become apparent as the following description ensues.

In the accompanying three sheets of drawings forming a part of this specification, one illustrative embodiment of the invention has been shown.

Figure 1:
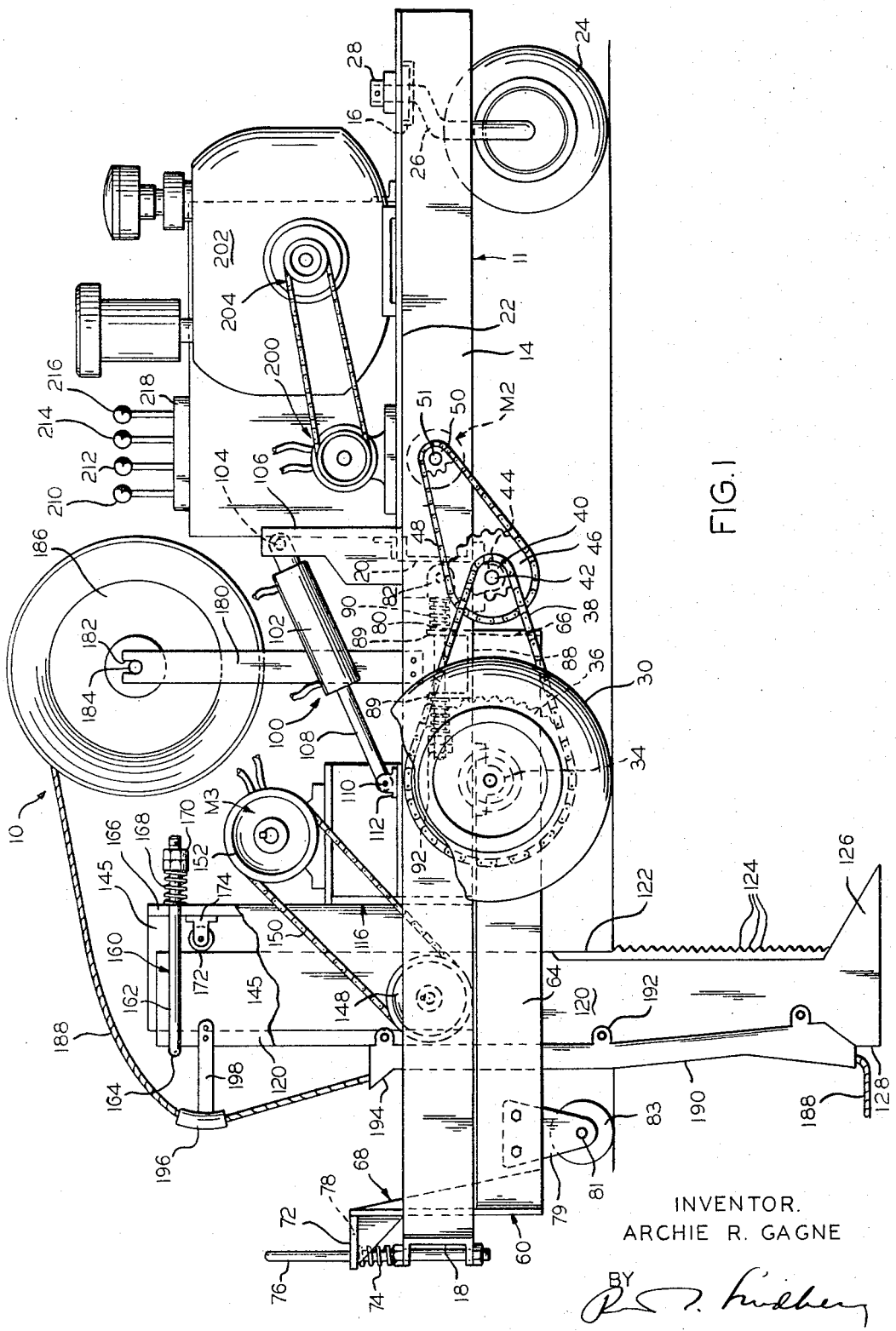
FIG. 1 is a side elevational view of a cable-laying plow constructed according to the principles of the present invention and showing the same in operation.
Figure 2:
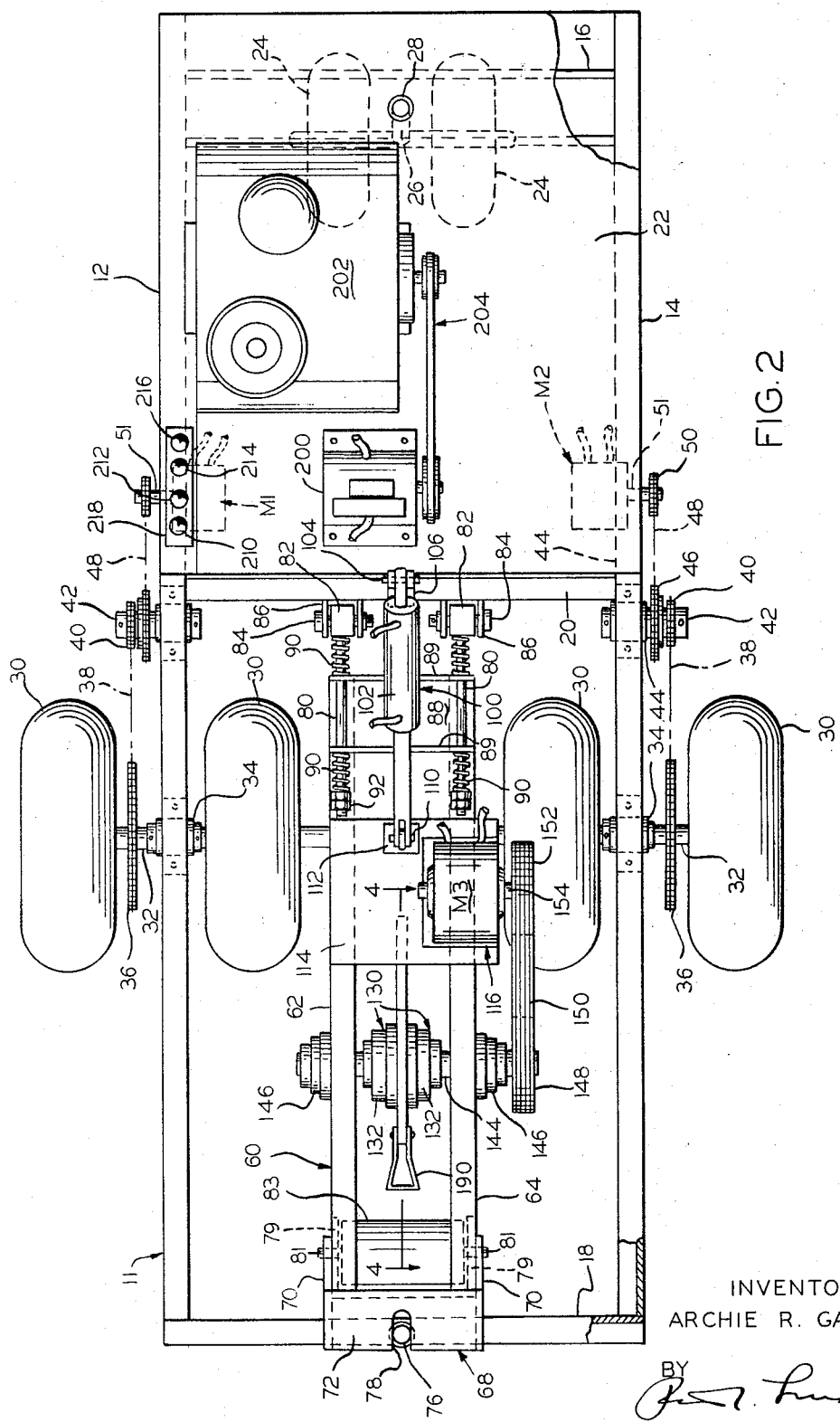
FIG. 2 is a plan view of the plow with the cable-supply drum removed in the interests of clarity.

Referring now to the drawings in detail and in particular to FIGS. 1 and 2, the cable-laying plow embodying the principles of the present invention is designated by the reference numeral 10. The plow 10 is in the form of a self-propelled vehicle including a rectangular shaped main chassis frame 11 having longitudinally extending side frame members 12 and 14, a front transverse frame member 16, a rear transverse frame member 18, and an intermediate transverse frame member 20. The side frame members 12 and 14 are in the form of inwardly presented lengths of channel stock. A platform 22 extends between and is supported on the side members 12 and 14 and extends substantially from the intermediate frame member 20 to the extreme forward end of the chassis frame 11.

The forward end of the chassis frame 11 is supported upon a dual wheel caster arrangement including caster wheels 24 supported upon a forked caster spindle 26, the upper end of which passes upwardly through the front transverse frame member 16 and platform 22, and is secured in position thereto by a set collar 28. The caster arrangement is of the free floating type.

The plow chassis frame is supported in its medial regions by two pairs of independently driven dual wheel assemblies each of which includes a pair of wheels 30 carried on an axle 32 journalled in a roller bearing assembly 34 bolted or otherwise secured to the underneath side of one of the side frame members 12 or 14 as the case may be. The wheels 30 of each pair straddle its adjacent side member and the associated axle 32 is fast to a sprocket 36 which is connected by a sprocket chain 38 to a relatively small sprocket 40 fast on an idler shaft 42 rotatable in bearings 44 secured to the underneath side of the adjacent side member 12 or 14 as the case may be. A second and larger sprocket 46 is fast on the idler shaft 42, and is connected by a sprocket chain 48 to a drive sprocket 50 fast on the drive shaft 51 of an hydraulic drive motor which is suitably supported on the adjacent side member. The motor on side frame member 12 which drives on pair of wheels 30 is designated M1, which the motor on the side member 14 which drives the other pair of wheels 30 is designated M2. Independent motors for each pair of wheels are provided for vehicles steering purposes as will be described in greater detail presently.

Still referring to FIGS. 1 and 2, a free floating lift frame 60 is effectively pivoted to intermediate frame member 20, and is movable between a lowered position wherein it is shown in full lines and a raised position, not shown. Lift frame 60 is generally of elongated narrow rectangular configurations, and includes a pair of side frame members 62 and 64· a front transverse frame member 66 and a rear transverse frame member 68. Rear transverse frame member 68 is in the form of a bracket having side flanges 70 which straddle the side members 62 and 64, and which project upwardly thereabove to carry at their upper ends a horizontal supporting plate 72. In the lowered position of the lift frame 60 the supporting plate 72 rests upon and is supported by the upper end of a compression spring 74 guided by a vertical pilot post 76 projecting upwardly from the rear transverse frame member 18. In the lowered position of the lift frame 60, the latter assumes a horizontal position and it is disposed slightly below the level of the chassis frame 11 as clearly shown in FIG. 1. The supporting plate 72 is formed with a notch or recess 78 medially of its rear edge, this notch constituting a clearance by means of which the pilot post 76 may project upwardly through the plate 72 when the lift frame 60 is in its lowered position.

A pair of generally triangular side plates 79 are secured to the side members 62 and 64 and serve to support therebetween a shaft 81 carrying a tamping roller 83, the nature and function of which will be described subsequently.

The forward end of the lift frame 60 is effectively pivoted to the intermediate transverse member 20 by a floating pivot connection including a pair of guide rods 80, the proximate ends of which are provided with enlarged heads 82 pivoted on pins 84 supported in brackets 86 secured to the intermediate transverse member 20. The extreme forward end of the lift frame 60 carries channel 88 with legs 89 thereof extending upward, and the two guide rods 80 pass through the vertical legs 89, channel 88 being longitudinally slidable upon the rods 80. Centering springs 90 encompass the opposite end regions of the guide rods 80 and bear against the legs 89 of channel 88, the forward springs 90 bearing against the enlarged heads 82, and the rear springs 90 bearing against lock nut assemblies 92 received on the extreme rear ends of the guide rods 80.

From the above description it will be seen that the lift frame 60, being fixedly secured to the sliding bracket, is floatingly mounted on the two guide pins 80 and is held by the springs 90 in a centered position wherein the notch 78 provided in the supporting plate 72 is in register with and encompasses the pilot pin 76 when the lift frame 60 is in its lowered position. When the lift frame is in its inclined elevated position, the gravitational weight of the latter compresses the two forward springs 90 and the entire lift frame slides forwardly and downwardly on the guide pins 80.

Movement of the lift frame 60 between its lowered horizontal position and its raised inclined position is effected under the control of an hydraulic fluid cylinder and plunger assembly 100 including a lift cylinder 102, the upper end of which is pivoted on a cross pin 104 extending between a pair of upstanding spaced plates 106 secured to the intermediate transverse frame member 20 of chassis frame 11. Lift cylinder 102 has a piston rod 108, the lower end of which is pivoted at 110 to a bracket 112 mounted on an elevated box-like platform 114 extending transversely between and is supported on the side members 12 and 14.

A box-like motor mount 116 is supported on the platform 114 and serves to support an hydraulic motor M3 which provides oscillatory motion for plowshare 120 carried by the lift frame 60 in a manner that will now be described.

The plowshare 120 is of thin blade-like design and it is supported on the lift frame 60 substantially centrally thereof in a vertical position. The plowshare is in the form of a vertically elongated, narrow steel plate, the forward edge thereof in the lower regions of the plowshare being tapered on sharpened as indicated at 122. This tapered portion or "shin" 122 is provided with a series of cutting teeth 124. The extreme lower end of the plowshare 122 is formed with a pointed toe 126 and a heel 128.

Figure 4:
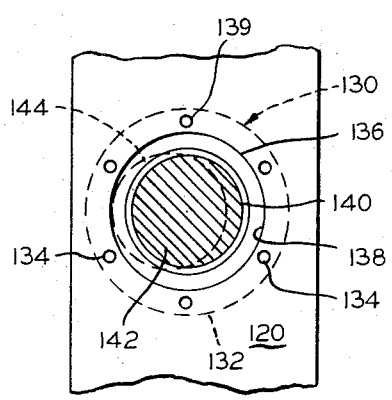
FIG. 4 is an enlarged sectional view taken substantially on the line 4—4 of FIG. 2.

The plowshare 120 is supported in its medial regions in an eccentric bearing assembly 130 which is preferably of the sealed roller type. The bearing assembly is provided with a split housing, the two sections 132 of which are bolted as at 134 to the opposite sides of the plowshare 120. As best seen in FIG. 4, the outer race 136 of the assembly 130 is seated within a circular opening or hole 138 provided in the plowshare 120 while the inner race 140 surrounds an eccentric cam 142 formed on a transverse supporting shaft 144 which extends between and projects through the side members 62 and 64 of the lift frame 60. The ends of the shaft 144 are mounted in bearings 146 carried in spaced vertical extensions 145 from the side frame members 62 and 64. One end of the shaft 144 projects outwardly of the lift frame 60 beyond the side member 64 and carries a V-belt pulley 148 which is connected in driven relationship by a multiple strand V-belt 150 to a driving V-belt pulley 152 mounted on output shaft 154 of the previously mentioned hydraulic motor M3.

The upper end of the plowshare 120 is yieldingly biased in a forward direction by means of a U-clamp 160, the legs 162 of which straddle the plowshare 120 and the bight portion 164 of which engages the trailing edge thereof. The clamp legs 162 are movable with respect to an abutment 166 extending between the spaced vertical frame extension 145 and at the upper forward edges thereof, and clamp 160 is yielding biased in a forward direction by means of compression springs 168 interposed between abutment 166 and locknut assemblies 170 carried on the forward ends of the clamp legs 162. U-clamp 160 serves to draw the upper end of the plowshare 120 in a forward direction against a guide roller 172 carried in a bracket 174 mounted on the rear side of abutment 166.

From the above description it will be observed that upon actuation of the hydraulic motor M3, and consequent rotation of the eccentric supporting shaft 144, an oscillatory motion will be imparted bodily to the plowshare 120. This oscillatory motion is not uniform over the entire area of the plowshare inasmuch as the lower end of the plowshare is free while the upper end of the plowshare is constrained to move with a rocking action against the roller 172. As will be described subsequently in connection with the diagram of FIG. 5, the motion of the lower end region of the plowshare, including the toothed "shin" 122 and the toe 126, is generally an elliptical motion, the attainment of which constitutes one of the principal features of the present invention.

A pair of side supports or standards 180 project upwardly from the side members 12 and 14, and have their upper ends notched as at 182 for reception therein of a supporting spindle 184 for a cable reel or drum 186. The cable 188 which is to be buried is adapted to be fed from the drum 186, from whence it passes through a guide channel 190 having attachment ears 192 by means of which it is secured to the rear or trailing edge region of the plowshare 120. The upper end of the guide channel 190 is preferably flared as at 194 to facilitate entry of the cable into the channel. The lower end of the channel 190 terminates adjacent the heel 128 of the plowshare 120. A short guide tube 196 is carried at the distal end of an arm 198 secured to plowshare 120 and serves to align the cable 188 with the flared end 194 of the guide channel.

The hydraulic motors M1 and M2 which serve to drive the traction wheels 30, the hydraulic motor M3 which initiates oscillation of the plowshare 120, and the piston and plunger assembly 102 which raises and lowers the lift frame 60 are all served by a common hydraulic pump 200 mounted on the platform 22. The pump 200 is driven by an internal combustion engine 202 by a belt and pulley arrangement 204.

Figure 3:
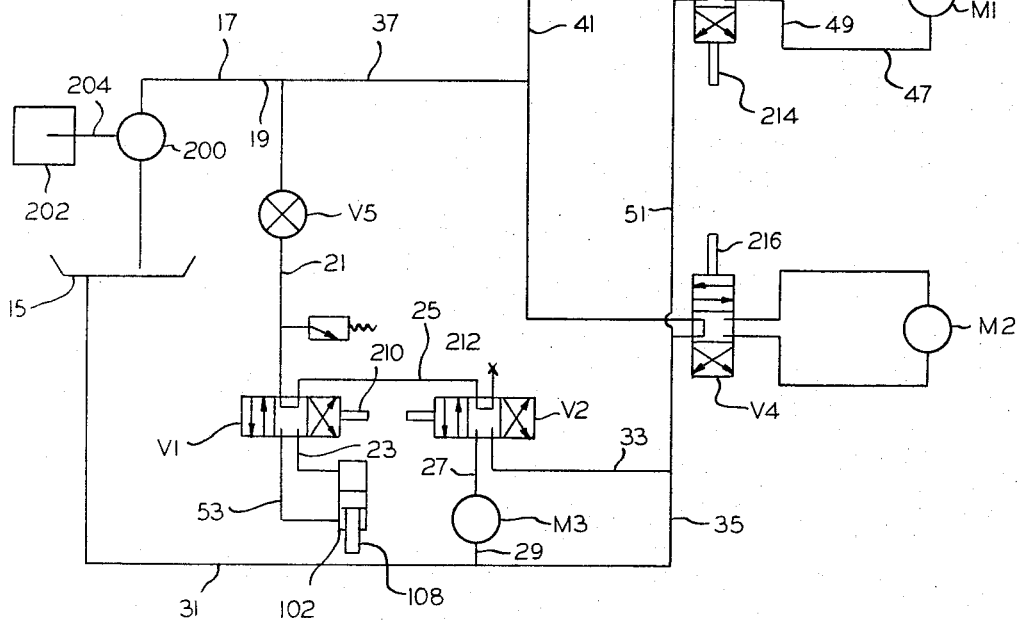
FIG. 3 is an hydraulic circuit diagram, schematically illustrating the hydraulic control mechanism for controlling the various plow functions.

The operation of the cable-laying plow 10 may conveniently be described in conjunction with the hydraulic circuit diagram of FIG. 3 wherein it is disclosed that hydraulic motive fluid for actuating the three motors M1, M2 and M3, as well as the lift cylinder 102, is supplied to the common pump 200 from a sump or tank 15 through a fluid line 17. Thus, when the internal combustion engine 202 is in operation, fluid is available at the outlet side of the pump 200 for selective actuation of the three motors and lift cylinder.

Assuming now that cable laying operations are to be undertaken at a given scene of operation, the lift frame 60 is first lowered to the horizontal full line position thereof shown in FIG. 1. This is accomplished by actuating a control valve V1 in such a manner that fluid under pressure is supplied to the upper end of the cylinder 102 from the discharge side of the pump 200 through lines 17, 19, 21, control valve V1 and line 23. Lowering of the lift frame 60 is preferably accompanied by oscillation of the plowshare 120, in which case a control valve V2 will be actuated so that a fluid circuit will extend through the motor M3, the circuit extending from the discharge side of the pump 200, through lines 19, 21, 25, 27, control valve V2, and lines 29, 31 back to the sump 15. When the motor M3 is not in operation, the control valve V2 is actuated to by-pass this motor through lines 33 and 35.

If the lift frame 60 is lowered during vibration of the plowshare 120 as described above, the toe 126 of the plowshare will work its way into the ground under the influence of the vibrating motion of the plowshare 120.

After the plowshare 120 has penetrated the ground to the depth permitted by the lift frame 60, forward motion will be imparted to the plow vehicle. The traction drive of the vehicle is accomplished by actuating a pair of control valves V3 and V4, valve V3 controlling the drive of the wheels 30 at side frame 12, and valve V4 controlling the drive of the wheels 30 at side frame 14. Valves V3 and V4 are reversing valves and, when actuated for wheel-driving purposes, and they establish similar fluid circuits through the motors M1 and M2. The circuit through the motor M1 extends from the pump 200, through lines 17, 37, 39, 41, valve V3, lines 43, 45, motor M1, lines 47, 49, valve V3, and lines 51, 35, 31, back to the sump 15. The circuit for the motor M2 is identical with the circuit through the motor M1 just described and requires no description.

Reversal of the motor M1 is accomplished by actuating the valve V3 in an opposite direction, so that fluid flows from the valve V3 through lines 49, 47, motor M1, and lines 45, 43 in the order named. It will be understood that the valves V3 and V4, in addition to being reversing valves, also are flow control valves and regulate the speed of their respective motors M1 and M2 so that proper steering of the vehicle may be accomplished.

Valves V1 and V2 are operable under the control of operating handles 210 and 212 respectively, while valves V3 and V4 are operable under the control of operating handles 214 and 216 respectively. The four handles 210, 212, 214 and 216 are available to the operator of the plow and, accordingly, they may be grouped as shown in FIG. 1 and project upwardly from a control box 218 supported on the frame bar 12.

It is to be noted at this point that when the oscillation control motor M3 is energized so that the plowshare is in oscillation, an appreciable amount of fluid is bled from the fluid line leading from the pump to the traction control motors M1 and M2 so that the maximum forward speed of the plow is not great. Suitable flow dividers may be employed at appropriate points in the hydraulic system where division of fluid takes place and these may be provided with orifices, either fixed or adjustable, so that the necessary fluid flow for efficient motor operation will take place, with no single motor causing an undue pressure drop in the fluid lines leading to the other motors.

With the oscillation control motor M3 in operation, the plowshare 120 effectively embedded in the ground, and the wheels 30 having tractional driving engagement with the ground, very little traction is required to advance the vehicle since the oscillatory movement of the plowshare exerts a slicing and impact action to reduce plow drag to a minimum. Since the cable guide channel 190 is rigidly attached to the trailing edge of the plowshare 120, this channel is also subject to oscillatory motion which agitates the cable and allows the same to pass freely through the guide channel and into the slit trench which is created progressively by the plowshare shin 122 as it advances forwardly through the ground. The tamping roller 83 receives at least some vibratory motion from the floating lift frame 60 and, since it trails the plowshare 120, it serves to progressively close the slit trench opened by the plowshare.

After cable laying operations have been completed, the lift frame may be raised to its dotted line position as shown in FIG. 1 by manipulation of the control valve V1 to establish a reverse flow of fluid through this valve, this circuit extending from the pump 200, through 17, 19, 21, valve V1, and line 53 to the lower end of the cylinder 102. After the lift frame has thus been raised, a valve V6 which is interposed in the line 21 leading to the vibrator motor M3 may be closed so that all of the fluid delivered by the pump 200 will be conducted through the circuit previously described leading from the pump to the two traction motors M1 and M2, thus making available to the plow a road speed considerably in excess of that which is possible when the plowshare 120 is oscillating under the control of the motor M3.

Figure 5:
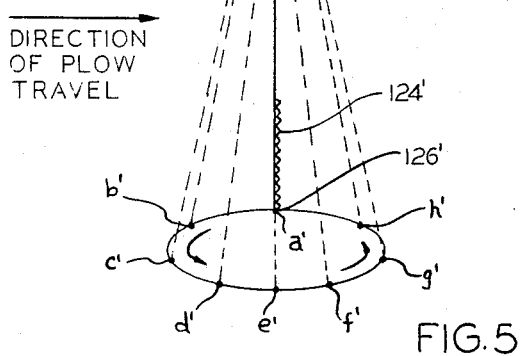
FIG. 5 is a diagrammatic view illustrating certain geometrical considerations associated with the oscillatory movement of the plowshare of the present invention.

Referring now to FIG. 5, wherein certain geometrical considerations associated with oscillation of the plowshare 120 have been portrayed, the line 120' represents the plowshare 120; the point 126' represents the toe 126; 124' represents the toothed "shin" 124 of the plowshare; the circle 142' represents the offset eccentric portion 142 of the supporting shaft 144; and the enlarged point 172' represents the roller 172. The points a, b, c, d, e, f and g represent progressive eccentric positions of the medial region of the plowshare 120 at its region of cooperation with the portion 142. By maintaining the upper end region of the line 120' in contact with the point 172' under the influence of the force indicated by the arrow 90' and which represents the spring 90, empirical manipulations will show that the point 126' will follow the path of a horizontally elongated ellipse on which the plotted positions of the point 126' are indicated at a', b', c', d', e', f', g', h'. The direction of elliptical oscillation of the point 126' is counterclockwise as indicated by the arrows. The plotted ellipse is thus representative of the path of movement of the toe 126 of the plowshare 120 as the plow oscillates. The progressively smaller ellipses in FIG. 4 are indicative of the elliptical paths of motion of the various teeth 124 on he leading edge or "shin" portion of the plowshare 120. These ellipses not only decrease in size but the ratio of the major axes thereof to the minor axes thereof also decreases so that in the vicinity of the eccentric portion 142 of the shaft 144 the motion becomes truly circular.

Above the eccentric portion 142, the direction of oscillation of various regions of the plowshare again becomes elliptical but the direction of oscillation is reversed or clockwise. The points a", b", c", d", e", f", g" and h" represent the path of movement of the extreme upper end of the plowshare. This motion of the upper end of the plowshare is purely incidental and has no function in connection with the plowing action of the plowshare.

The elliptical path of movement of the lower regions of the plowshare during cable-laying operations constitutes one of the principal features of the present invention. As previously stated, such oscillation reduces the tractive effort required by the wheels 30 to drive the plow. The reason for this is three-fold. Not only does such oscillatory motion create a slicing action upon the ground undergoing trenching, but also the fact that the direction of oscillation is in a clockwise direction as viewed in FIG. 1 causes the toe 126 to move upwardly as it encounters fresh compact earth, thus exerting a reaction force on the plow chassis tending to pull the wheels 30 downwardly into good tractional contact with the ground. Still further, during oscillation of the plowshare, the backward component of motion of the lower regions of the plowshare 120, including the toe 126, is at a rate of speed which is in excess of the forward travel of the plow. Thus during each oscillation of the plowshare the "shin" portion thereof is retracted a slight distance and then forcibly moved forwardly so that a percussive trenching action is attained.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

Having thus described the invention, what I claim and desire to secure by Letters Patent is:

1. In a plow for progressively cutting a slit-type trench in soil, a chassis frame, supporting wheels for said frame, a lift frame pivoted at one end to said chassis frame and movable between lowered and raised positions, shaft bearings carried by said lift frame, a horizontal shaft journalled in said bearings and having an eccentric cam thereon, a vertically disposed relatively thin blade-like plowshare having a bearing medially of its ends for receiving said eccentric cam, said plowshare extending vertically downwardly below the bearing and having its lower end region adapted to project into and progressively form a slit-type trench in the soil as the plow is propelled forwardly, said plowshare also extending upwardly above the bearing, an abutment on said lift frame above the level of said eccentric cam and slidably engageable with the leading edge of the upper region of said plowshare to limit the extent of forward movement of said upper end region during rotation of the cam, means on said lift frame providing a second abutment engageable with the trailing edge of the upper region of the plowshare and constraining said upper region of the plowshare against rearward movement whereby the lower end region of the plowshare is constrained to move in a horizontally elongated elliptical path, and means for rotating the shaft.

2. In a plow for progressively cutting a slit-type trench in soil, in combination: a chassis frame, supporting wheels for said frame, a lift frame pivoted at one end to said chassis frame and movable between lowered and raised positions, shaft bearings carried by said lift frame, a horizontal shaft journalled in said bearings and having an eccentric cam thereon, a vertically disposed relatively thin blade-like plowshare having a bearing medially of its ends for receiving said eccentric cam, said plowshare extending vertically downwardly below the bearing and having its lower end region adapted to project into and progressively form a slit-type trench in the soil as the plow is propelled forwardly, said plowshare also extending upwardly above the bearing, an abutment on said lift frame above the level of said eccentric cam and slidably engageable with the leading edge of the upper region of said plowshare to limit the extent of forward movement of said upper end region during rotation of the cam, spring means effective between the plowshare and lift frame yieldingly biasing the upper end region of the plowshare forwardly against said abutment whereby the lower end region of the plowshare is constrained to move in a horizontally elongated elliptical path, and means for rotating said shaft.

3. In a plow for progressively cutting a slit-type trench in soil, the combination set forth in claim 2 and wherein said spring means comprises a U-clamp, the legs of which straddle the upper end region of the plowshare, and a compression spring effective between the lift frame and each leg of the U-clamp for drawing the bight portion of the U-clamp hard against the trailing edge of the upper region of the plowshare.

4. In a self-propelled plow for progressively cutting a slit-type trench in soil, in combination: a chassis frame, tractional supporting and driving wheels for said frame, a lift frame pivoted at one end to said chassis frame and movable between lowered and raised positions, shaft bearings carried by said lift frame, a horizontal shaft journalled in said bearings and having an eccentric cam thereon, a vertically disposed relatively thin blade-like plowshare having a bearing medially of its ends for receiving said eccentric cam, said plowshare extending vertically downwardly below the bearing and having its lower end region adapted to project into and progressively form a slit-type trench in the soil as the plow is propelled forwardly, said plowshare also extending upwardly above the bearing, an anti-friction roller on said lift frame above the level of said eccentric cam and slidably engageable with the leading edge of the upper region of said plowshare to limit the extent of forward movement of said upper end region during rotation of the cam, spring means effective between the plowshare and lift frame yieldingly biasing the upper end region of the plowshare forwardly against said roller whereby the lower end region of the plowshare is constrained to oscillate in a horizontally elongated elliptical path, means for rotating said shaft in a direction effective to cause upward movement of the lower end of the plowshare in the forward region of said elliptical path and downward movement of said lower end in the rear region of said elliptical path, and power actuated means on said chassis frame for driving said tractional supporting wheels.

5. In a self-propelled plow for progressively cutting a slit-type trench in soil, the combination set forth in claim 4 and including a forwardly extending toe on the extreme lower end of said plowshare and effective during upward movement of the oscillating lower end of the plowshare to exert a reaction force through the plowshare, bearing, shaft, lift frame and chassis frame to said tractional supporting wheels tending to draw the latter downwardly and enhance the tractional characteristics thereof.

6. In a self-propelled plow for progressively cutting a slit-type trench in soil, the combination set forth in claim 4 and including a forwardly extending toe on the extreme lower end of said plowshare and a series of serrations on the leading edge of the plowshare immediately above said toe, said serrations and toe being effective during upward movement of the oscillating lower end of the plowshare to exert a reaction force through the plowshare, bearing, shaft, lift frame and chassis frame to said tractional supporting wheels tending to draw the latter downwardly and enhance the tractional characteristics thereof.

7. In a self-propelled cable-laying plow for progressively cutting a slit-type trench in soil and depositing a cable in the trench, in combination, a chassis frame, traction wheels supporting said frame, a lift frame pivoted at its forward end to a medial region of said chassis frame and movable between a lowered substantially horizontal position and a raised inclined position, shaft bearings carried by the lift frame, a horizontal shaft journalled in said bearings and having an eccentric cam thereon, a vertically disposed relatively thin blade-like plowshare having a bearing medially of its ends for receiving said eccentric cam, said plowshare extending vertically downwardly below the bearing and having its lower end region adapted to project into and progressively form a slit-type trench in the soil as the plow is propelled tractionally forwardly, said plowshare also extending upwardly above the bearing, confining means for the upper end region of said plowshare constraining the same to shift vertically with no appreciable component of vertical motion during rotation of the eccentric cam whereby the lower end region of the plowshare is constrained to move in a horizontally elongated elliptical path, means for rotating said shaft in a direction effective to cause upward movement of the lower end of the plowshare in the forward region of said elliptical path and downward movement of said lower end in the rear region of said elliptical path, a cable-supporting reel rotatably mounted on said chassis frame, an elongated guide tube substantially coextensive with and secured to the trailing edge of said plowshare and oscillatable in unison with the latter for feeding cable issuing from the reel into the trench, and means for driving said traction wheels to propel the plow forwardly.

8. In a self-propelled cable-laying plow for progressively cutting a slit-type trench in soil and depositing a cable in the trench, the combination set forth in claim 7 including a forwardly extending toe on the lower end of the plowshare and effective during upward movement of the plowshare during oscillation thereof to exert a reaction force through the plowshare, bearing, eccentric cam, shaft, lift frame and chassis frame tending to draw the traction wheels downwardly into firm tractional engagement with the soil.

9. In a self-propelled cable-laying plow for progressively cutting a slit-type trench in soil and depositing a cable in the trench, the combination set forth in claim 8 including a compression spring effective between the rear end of the lift frame and chassis frame for floatingly supporting the rear end of the lift frame when the latter is in its lowered position.

10. In a self-propelled cable-laying plow for progressively cutting a slit-type trench in soil and depositing a cable in the trench, the combination set forth in claim 8 including a tamping roller secured to said lift frame and trailing said plowshare when the lift frame is in its lowered position.

11. In a self-propelled cable-laying plow for progressively cutting a slit-type trench in soil and depositing a cable in the trench, in combination: a chassis frame, a pair of traction wheels supporting said frame, a lift frame pivoted at its forward end to a medial region of said chassis frame and movable between a lowered substantially horizontal position and a raised inclined position, shaft bearings carried by the lift frame, a horizontal shaft journalled in said bearings and having an eccentric cam thereon, a vertically disposed relatively thin blade-like plowshare having a bearing medially of its ends for receiving said eccentric cam, said plowshare extending vertically downwardly below the bearing and having its lower end region adapted to project into and progressively form a slit-type trench in the soil as the plow is propelled tractionally forwardly, said plowshare also extending upwardly above the bearing, confining means for the upper end region of said plowshare constraining the same to shift vertically with no appreciable component of vertical motion during rotation of the eccentric cam whereby the lower end region of the plowshare is constrained to move in a horizontally elongated elliptical path, a fluid motor supported on and movable bodily with the lift frame for rotating said shaft in a direction effective to cause upward movement of the lower end of the plowshare in the forward region of said elliptical path and downward movement of said lower end in the rear region of said elliptical path, an hydraulic cylinder and plunger assembly effective between the lift frame and chassis frame for raising and lowering the lift frame, a fluid motor for each traction wheel, mounted on said chassis frame and operatively connected to the wheel in driving relationship, a pump on said chassis frame for supplying motive fluid to said fluid motors and to the cylinder and plunger assembly, a manually operable control valve effective between each fluid motor and the pump for controlling the operation of the fluid motor, a manually operable control valve effective between the cylinder and plunger assembly and the pump for controllling operation of the former, and an internal combustion engine mounted on the chassis frame and operatively connected to the pump in driving relationship.

12. In a self-propelled cable-laying plow for progressively cutting a slit-type trench in soil and depositing a cable in the trench, in combination: a chassis frame, traction wheels supporting said frame, a lift frame pivoted at its forward end to a medial region of said chassis frame and movable between a lowered substantially horizontal position and a raised inclined position, shaft bearings carried by the lift frame, a horizontal shaft journalled in said bearings and having an eccentric cam thereon, a vertically disposed relatively thin blade-like plowshare having a bearing medially of its ends for receiving said eccentric cam, said plowshare extending vertically downwardly below the bearing and having its lower end region adapted to project into and progressively form a slit-type trench in the soil as the plow is propelled tractionally forwardly, said plowshare also extending upwardly above the bearing, confining means for the upper end region of said plowshare constraining the same to shift vertically with no appreciable component of vertical motion during rotation of the eccentric cam whereby the lower end region of the plowshare is constrained to move in a horizontally elongated elliptical path, a fluid motor supported on and movable bodily with the lift frame for rotating said shaft in a direction effective to cause upward movement of the lower end of the plowshare in the forward region of said elliptical path and downward movement of said lower end in the rear region of said elliptical path, an hydraulic cylinder and plunger assembly effective between the lift frame and chassis frame for raising and lowering the lift frame, a fluid motor for each traction wheel, mounted on said chassis frame and operatively connected to the wheel in driving relationship, a pump on said chassis frame for supplying motive fluid to said fluid motors and to the cylinder and plunger assembly, a manually operable control valve effective between each fluid motor and the pump for controlling the operation of the fluid motor, a manually operable control valve effective between the cylinder and plunger assembly and the pump for controlling the operation of the former, a manually operable valve selectively operable to render the fluid motor which rotates said shaft ineffective, and an internal combustion engine mounted on the chassis frame and operatively connected to the pump in driving relationship.

References Cited

UNITED STATES PATENTS

| 338,678 | 3/1886 | Sullivant | 61—72.5 |
| 2,792,769 | 5/1957 | Harshberger | 172—40 |
| 2,905,253 | 9/1959 | Ditter | 172—19 |
| 2,949,871 | 8/1960 | Finn. | |
| 3,103,250 | 9/1963 | Lamb. | |
| 3,170,300 | 2/1965 | Kelley | 61—72.6 |
| 3,201,948 | 8/1965 | Schramm | 61—72.6 |

FOREIGN PATENTS

| 629,544 | 5/1936 | Germany. |

EARL J. WITMER, *Primary Examiner.*